(12) United States Patent
Han et al.

(10) Patent No.: US 12,214,440 B1
(45) Date of Patent: Feb. 4, 2025

(54) MAGNESIUM/TITANIUM COMPOSITE PLATE WITH LARGE THICKNESS RATIOS AND GRADIENT HETEROTHERMAL ROLLING BONDING METHOD

(71) Applicant: TAIYUAN UNIVERSITY OF TECHNOLOGY, Taiyuan (CN)

(72) Inventors: Jianchao Han, Taiyuan (CN); Junxin Wei, Taiyuan (CN); Shuaishuai Zhang, Taiyuan (CN); Zhenhao Yuan, Taiyuan (CN); Yizhi Zhang, Taiyuan (CN); Ran Li, Taiyuan (CN); Xinxin Liu, Taiyuan (CN); Yi Jia, Taiyuan (CN); Tao Wang, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 0 days.

(21) Appl. No.: 18/612,255

(22) Filed: Mar. 21, 2024

(30) Foreign Application Priority Data

Jul. 31, 2023 (CN) .......................... 202310942851.7

(51) Int. Cl.
*B23K 20/00* (2006.01)
*B23K 20/04* (2006.01)
(Continued)

(52) U.S. Cl.
CPC .............. *B23K 20/04* (2013.01); *B23K 20/16* (2013.01); *B23K 20/2333* (2013.01);
(Continued)

(58) Field of Classification Search
CPC ....... B21B 1/22; B21B 2001/386; B21B 1/08; B23K 11/061; B23K 11/11; B23K 31/02; B23K 9/025; B23K 9/18
See application file for complete search history.

(56) References Cited

U.S. PATENT DOCUMENTS

| | | | |
|---|---|---|---|
| 4,616,393 A * | 10/1986 | Beauregard | B21B 1/38 29/423 |
| 5,147,733 A * | 9/1992 | Werquin | B21B 27/00 428/685 |

(Continued)

FOREIGN PATENT DOCUMENTS

| | | |
|---|---|---|
| CN | 104014589 A | 9/2014 |
| CN | 105436203 A | 3/2016 |

(Continued)

OTHER PUBLICATIONS

Zichen Qi et al., "Microstructure and bonding properties of magnesium alloyAZ31/CP—Ti clad plates fabricated by rolling bonding," Journal of Manufacturing Processes, Apr. 2018, pp. 175-186, 32.

(Continued)

*Primary Examiner* — Erin B Saad
(74) *Attorney, Agent, or Firm* — Piloff Passino & Cosenza LLP; Rachel Piloff; Sean Passino

(57) ABSTRACT

A magnesium/titanium composite plate with large thickness ratios and a gradient heterothermal rolling bonding method are provided by the present disclosure, relating to the technical field of rolling bonding plates. The method includes following steps: assembling blanks according to a sequence of titanium strip, transition layer foil and magnesium alloy plate to obtain a composite blank; carrying out induction heating treatment on one side of the titanium strip of the composite blank, then rolling, and carrying out heat treatment on a composite plate blank after rolling to obtain the magnesium/titanium composite plate with large thickness ratios; and a thickness ratio of the magnesium alloy plate to the titanium strip is greater than or equal to 20:1.

3 Claims, 8 Drawing Sheets

(51) Int. Cl.
- *B23K 20/16* (2006.01)
- *B23K 20/233* (2006.01)
- *B23K 20/24* (2006.01)
- *B23K 101/18* (2006.01)
- *B23K 101/34* (2006.01)
- *B23K 103/08* (2006.01)
- *B23K 103/14* (2006.01)

(52) U.S. Cl.
CPC .......... *B23K 20/24* (2013.01); *B23K 2101/18* (2018.08); *B23K 2101/34* (2018.08); *B23K 2103/14* (2018.08); *B23K 2103/15* (2018.08)

(56) References Cited

U.S. PATENT DOCUMENTS

| | | | |
|---|---|---|---|
| 2016/0271664 A1* | 9/2016 | Huang | B21D 13/04 |
| 2016/0271674 A1* | 9/2016 | Huang | B23K 9/18 |
| 2022/0184678 A1* | 6/2022 | Liu | B21B 37/005 |
| 2022/0212280 A1* | 7/2022 | Song | B21B 1/22 |

FOREIGN PATENT DOCUMENTS

| | | |
|---|---|---|
| CN | 105521994 A | 4/2016 |
| CN | 106862271 A | 6/2017 |
| CN | 108114980 A | 6/2018 |
| CN | 110434173 A | 11/2019 |
| CN | 113290051 A | 8/2021 |
| CN | 115200373 A | 10/2022 |
| CN | 115672983 A | 2/2023 |
| CN | 115739998 A | 3/2023 |
| CN | 116393512 A | 7/2023 |
| WO | 2017018511 A1 | 2/2017 |

OTHER PUBLICATIONS

First Office action for China Application No. 202310942851.7, mailed Aug. 31, 2023.
Notice to Grant for China Application No. 202310942851.7, mailed Sep. 16, 2023.
First Search Report for China Application No. 202310942851.7, dated Aug. 29, 2023.
Supplemental Search Report for China Application No. 202310942851.7, dated Sep. 11, 2023.

* cited by examiner

MAGNESIUM/TITANIUM COMPOSITE PLATE WITH LARGE THICKNESS RATIOS AND GRADIENT HETEROTHERMAL ROLLING BONDING METHOD

CROSS-REFERENCE TO RELATED APPLICATIONS

This application claims priority to Chinese Patent Application No. 202310942851.7, filed on Jul. 31, 2023, the contents of which are hereby incorporated by reference.

TECHNICAL FIELD

The present disclosure relates to the technical field of rolling bonding composite plates, and in particular to a magnesium/titanium composite plate with large thickness ratios and a gradient heterothermal rolling bonding method.

BACKGROUND

Magnesium and magnesium alloy are the lightest metal structural materials for engineering applications at present, with excellent metallic properties such as low density, high specific strength and specific stiffness; however, further application of magnesium and magnesium alloy is restricted by the shortcomings of poor co-ordination of plastic deformation and poor corrosion resistance under normal temperature conditions. Titanium, as a new generation of "space metal" and "ocean metal", has excellent specific strength, oxidation resistance and corrosion resistance. Accordingly, with very thin titanium and titanium alloy strip as the cladding, magnesium alloy plate with large thickness as the base layer, the magnesium-titanium composite plate with large thickness ratios is manufactured with good corrosion resistance and surface strength under the premise of almost no loss of surface density of the plate, suggesting a great application prospect in the aerospace field where the requirements for density and comprehensive performance of the material are extremely challenging.

The preparation methods of magnesium/titanium composite plate mainly include explosive welding method, diffusion welding method and rolling bonding method. In the explosive welding method, the three-layer plate includes a magnesium alloy as the substrate, a titanium plate as the cladding plate, and an aluminium alloy plate as the transition plate, and the detonation waves caused by explosions are utilized to collide the contact surfaces of the three metal plates at a high speed, so that the materials are formed into a composite at one time. However, with the explosive welding method, it is easy to produce local unwelding, which is especially easy to appear in the boundary zone when the cladding plate is relatively thick; meanwhile, a local melting zone is produced in the bonding surface of magnesium/aluminium, whose main components are hard and brittle magnesium-aluminium intermetallic compounds, resulting in a decreased bonding strength of the magnesium/titanium composite plate. Moreover, explosion welding method is also prone to cause a series of problems such as burns, indentations, tears, etc. of the substrate or cladding plate. Diffusion welding method is a preparation method whereby the surfaces of titanium, aluminium alloy and magnesium alloy plates are brought into contact with each other under a certain temperature and pressure, and the physical contact of the surfaces to be welded is enlarged through microscopic plastic deformation or through the generation of trace liquid phases at the welding surfaces, and then after a long period of time, the composite of magnesium/titanium plates is achieved through continuous diffusion and mutual penetration. Considering the low solid solubility between two elements of titanium and magnesium and the absence of intermetallic compound phase, the long duration required for direct solid-state diffusion composite, the limited size and shape of the products, the diffusion welding method is not applicable to the industrial large-scale production. Rolling bonding method is to roll the magnesium alloy plate and titanium plate into magnesium/titanium composite plate by a rolling mill. However, the two metal materials are not easy to be solubilized into each other. Titanium strip and magnesium as well as magnesium alloy plate of large thickness in direct composite does not produce intermetallic compounds on the bonding surface, and the degree of mutual diffusion among the atoms is low, resulting in the low stability of the bonding interface and mechanical properties, and a large rolling reduction is required for direct rolling bonding. Also, there is a large plastic deformation difference between magnesium or magnesium alloy plates with large thickness against the titanium strip (titanium foil), and the deformation of titanium strip is much smaller than that of magnesium or magnesium alloy plate with large thickness. Under composite rolling of large rolling reduction, the total deformation of the plate blank is mainly concentrated on the magnesium or magnesium alloy plate of large thickness, resulting in a crushed titanium strip as the deformation is extremely uncoordinated, and the plate is prone to cracking and failed to be rolled for composite as a result of the poor bonding stability of the interface.

As mentioned above, the existing preparation methods of magnesium/titanium composite plates with large thickness ratios all have different degrees of defects.

SUMMARY

Based on the above contents, the present disclosure provides a magnesium/titanium composite plate with large thickness ratios and a gradient heterothermal rolling bonding method. The magnesium/titanium composite plate with large thickness ratios prepared by the method according to the present disclosure has good bonding interface stability and mechanical properties, uniform tissue components, and the composite plate blank is of good surface quality.

In order to achieve the above objectives, the present disclosure provides following technical schemes.

One of the technical schemes of the present disclosure is a preparation method of a magnesium/titanium composite plate with large thickness ratios, including following steps:
  assembling blanks according to a sequence of titanium strip, transition layer foil and magnesium alloy plate to obtain a composite blank;
  carrying out induction heating treatment on one side of the titanium strip of the composite blank, then rolling, and carrying out heat treatment on the composite plate billet after rolling to obtain the magnesium/titanium composite plate with large thickness ratios; and
  a thickness ratio of the magnesium alloy plate to the titanium strip is greater than or equal to 20:1.

Optionally, the titanium strip, the transition layer foil and the magnesium alloy plate are respectively subjected to annealing treatment before assembly, specifically, the titanium strip is hold at 900-1000 degrees Celsius (° C.) for 60-90 minutes (min), the transition layer foil is hold at 300-400° C. for 5-15 min, the magnesium alloy plate is hold at 300-400° C. for 30-60 min, and an atmosphere of the annealing treatment is an argon atmosphere of 0.95-1 megapascal (MPa), with a mass purity of argon being 99.99%;

the annealing treatment is carried out to reduce the residual stresses generated in the production of titanium strip, transition layer foil and magnesium alloy plate, to reduce the tendency of cracking, to refine the grains and to eliminate the organizational defects; the blanks after heat treatment are then assembled to ensure the composite quality of the magnesium/titanium composite plate with large thickness ratios.

After the annealing treatment, the titanium strip, transition layer foil and magnesium alloy plate are further subjected to a step of surface treatment to remove oxide layers, including grinding the oxide layer appropriately along a rolling direction by using a rotating steel wire method to remove the oxide layer, so that a roughness of the contact surface reaches Average roughness (Ra)1.6-Ra0.8.

The transition layer foil is aluminum foil, zinc foil or aluminum-zinc alloy foil.

Optionally, the induction heating treatment includes following steps:

placing an induction heating coil on one side of the titanium strip of the composite blank to make the induction heating coil parallel to the composite blank, adjusting a distance between the induction heating coil and the composite blank to be 3-10 millimeters (mm), and setting a heating temperature of heating the composite blank to be 400-600° C. for 15-150 s. A frequency of an induction heating power supply is 500-3000 hertz (Hz), and a current density is set to 10-90 $e^5$ amperes per square meter (A/m$^2$).

Parameters of induction heating herein mainly affect the temperature, depth and temperature uniformity of the heating area. Parameters set lower than the above-documented ranges result in the failure of the temperature of the composite blank to reach the composite temperature, which further causes unstable performance of the bonding interface, and if the temperature is too low, the titanium strip will be crushed in the composite rolling process as a result of the great difference of the melting points and different hardness of the titanium strip and the magnesium with a large thickness; yet, parameters higher than the above-documented ranges will cause the temperature distribution uniformity to be poor, and the overburning will be caused by the overheating of the area.

The induction coil has a flat spiral rectangular or circular hollow structure, allowing cooling water to be passed through to prevent the induction coil from burning out at too high a temperature.

Optionally, a rolling reduction is 15-20% and a rolling speed is 0.5-1.0 meter per second (m/s).

When the thickness difference between the magnesium plate (magnesium alloy plate) and the titanium strip is too large, the rolling reduction will be too large and cause the blank rolling reduction to be uncoordinated, which means that the rolling reduction of magnesium plate with large thickness is much greater than that of the titanium strip, and the position is deviated from the bonding interface. The rolling reduction being too large, 25% and above for instance, causes the titanium strip to break up, while the rolling reduction being too small results in the titanium strip not being able to be composited with the magnesium plate.

The rolling speed is required to be matched with the temperature rising speed of the induction heating of the composite blank, which should not be too fast, and it is recommended to be 0.5-1 m/s. Too fast a rolling speed leads to the increase of force and energy load in the rolling process, while too slow a rolling speed causes the temperature drop of the blank to increase and the force and energy load in the rolling process to increase, which ultimately affects the interface quality of the composite blank.

Optionally, the heat treatment specifically includes holding at 400-500° C. for 60-90 min, an atmosphere of the heat treatment is 0.95-1 MPa argon atmosphere, with a mass purity of argon being 99.99%.

It is difficult to promote element diffusion and improve the effect of bonding strength when the temperature of the heat treatment is too low; an excessively high temperature of the heat treatment leads to intensified element diffusion, thus producing an excessively thick intermetallic compound layer at the composite interface to deteriorate the bonding properties, and causing coarsening of the matrix organization as well as decreasing comprehensive mechanical properties thereof. Therefore, it is preferable to limit the temperature of the heat treatment to 400-500° C.

Optionally, a thickness of the magnesium alloy plate is 8-20 mm, a thickness of the titanium strip is 0.1-0.3 mm, and a thickness of the transition layer foil is 0.02-0.1 mm.

Optionally, the magnesium alloy plate is one selected from a group of AZ31, AZ61, and AZ80; the aluminum foil is one selected from a group of AA1100, AA6061, and AA7075; and the titanium strip is one selected from a group of TAT, TA2, TC4, TC6, and TC10.

Another technical scheme of the present disclosure provides a magnesium/titanium composite plate with large thickness ratios prepared by the preparation method.

Another technical scheme of the present disclosure provides an application of the magnesium/titanium composite plate with large thickness ratios in preparing parts for space stations, satellites, and round-trip vehicles between space and earth.

Another technical scheme of the present disclosure provides a heterothermal rolling device for preparing the magnesium/titanium composite plate with large thickness ratios, where the heterothermal rolling device includes a guide rail support, two sides of the guide rail support are fixedly connected with a two-roll mill, a coil lifting device is fixedly connected to a feeding side of the two-roll mill and a top surface of one end of the guide rail support, the guide rail support is located between bottom ends of the two-roll mill, and the feeding side of the two-roll mill is correspondingly arranged with a discharging end of the coil lifting device.

Optionally, the coil lifting device includes a supporting base fixedly connected to the feeding side of the two-roll mill and the top surface of one end of the guide rail support, electric push rods vertically fixedly connected to both sides of the supporting base, a sliding guide rail fixedly connected to a top surface of the supporting base, a coil bracket fixedly connected between top ends of two groups of the electric push rods, and a heating coil fixedly connected to the coil bracket. A conveying direction of the sliding guide rail is perpendicular to surfaces of the two groups of the electric push rods, the heating coil is correspondingly configured above the sliding guide rail, and the feeding side of the two-roll mill is correspondingly configured with the discharging end of the sliding guide rail.

The present disclosure achieves the following technical effects.

In view of the requirements for density and comprehensive performance of key parts for space vehicles such as space stations, satellites, and round-trip vehicles between space and earth, the present disclosure takes magnesium alloy of large thickness as the base layer and titanium alloy of very thin thickness as the cladding layer, and develops the magnesium/titanium composite plate of large thickness ratios (the thickness ratio of magnesium/titanium is 20:1 and above), with excellent corrosion resistance and toughness of the surface layer of titanium alloy without loss of density of the magnesium alloy.

Based on the plastic deformation characteristics and thickness difference of magnesium/titanium heterogeneous materials, the present disclosure develops a gradient heterothermal rolling bonding method, whereby a temperature gradient from titanium alloy strip to magnesium alloy of large thickness is formed, with the titanium alloy strip, the titanium/magnesium interface, and the magnesium alloy near the interface maintaining higher temperatures (450-600° C.), and the side temperature of magnesium alloy decreasing gradually. High temperature at the interface is conducive to the plastic deformation of heterogeneous materials and interfacial bonding, the relative low temperature at the far interfacial position ensures the strength of magnesium alloy materials, which helps to concentrate the plastic deformation in the area near the interfacial position, giving the interfacial region a larger relative deformation; the deformation ratio of titanium strip and magnesium alloy plate of large thickness in the total deformation of composite plate is similar, and the deformation is coordinated, which promotes the high-quality combination of heterogeneous materials under small rolling reduction (15-20% rolling reduction), thus lowering the critical composite deformation rate and greatly reducing the performance requirements for the rolling mill.

The present disclosure adopts the electromagnetic induction heating technology, in which the flat induction heating coil is placed in parallel with the composite blank, so that the magnetic force lines pass through the composite plate perpendicularly, and the temperature of the blank is precisely controlled by adjusting the heating current, heating duration, and the distance between the heating coil and the blank. The closer the plate is to the induction heating coil, the higher the temperature is; the temperature of the plate away from the coil is relatively low, so as to realize the gradient distribution and control of the temperature in the direction of the thickness of the blank. The present disclosure is synchronously designed with a heating coil lifting mechanism, which is used to fix the electromagnetic induction heating coil; and through the externally connected lifting device, the up and down position shifting of the induction heating device of the blank is enabled, so that the electromagnetic induction coil is parallel to the blank with a controllable distance, thus realizing the rapid heating of the blank and constructing a controllable gradient temperature field in the direction of the thickness. Compared with the traditional heating method, the induction heating device is more energy-saving, more efficient and more accurate in controlling the temperature.

By adding intermediate transition layer of aluminium, zinc and other metals or alloy foil to the titanium strip and magnesium alloy plate of large thickness, the failure of metallurgical bonding caused by the absence of elemental diffusion and intermetallic compounds between titanium and magnesium heterogeneous metals is prevented according to the present disclosure, and the intermediate transition layer forms a stable bonding interface with the titanium strip and the magnesium alloy plate of large thickness, which helps to achieve the high-efficiency and high-quality bonding between the heterogeneous metals of magnesium and the titanium.

According to the gradient heterothermal rolling of magnesium/titanium composite plate with large thickness ratios, the composite plate is continuously rolled under small rolling reduction, with coordinated plastic deformation of heterogeneous materials of magnesium and titanium, combined with good interfacial stability and mechanical properties, homogeneous organizational composition, and good surface quality of the composite blank.

BRIEF DESCRIPTION OF THE DRAWINGS

For a clearer description of the technical schemes in the embodiments of the present disclosure or in the prior art, the accompanying drawings to be used in the embodiments are briefly described hereinafter, and it is obvious that the accompanying drawings in the description hereinafter are only some of the embodiments of the present disclosure, and that for the person of ordinary skill in the field, other accompanying drawings are available on the basis of the accompanying drawings without any creative labour.

DETAILED DESCRIPTION OF THE EMBODIMENTS

Various exemplary embodiments of the present disclosure are now described in detail, which detailed description should not be considered as a limitation of the present disclosure, but should be understood as a more detailed description of certain aspects, features and embodiments of the present disclosure.

It should be understood that the terminology described in the present disclosure is only for describing specific embodiments and is not used to limit the present disclosure. In addition, for the numerical range in the present invention, it should be understood that each intermediate value between the upper limit and the lower limit of the range is also specifically disclosed. The intermediate value within any stated value or stated range and every smaller range between any other stated value or intermediate value within the stated range are also included in the present disclosure. The upper and lower limits of these smaller ranges are independently included or excluded from the range.

Unless otherwise specified, all technical and scientific terms used herein have the same meaning as commonly understood by one of ordinary skill in the art to which this disclosure relates. Although the present disclosure only describes the preferred methods and materials, any methods and materials similar or equivalent to those described herein can also be used in the practice or testing of the present disclosure. All documents mentioned in this specification are incorporated by reference to disclose and describe methods and/or materials related to the documents. In case of conflict with any incorporated document, the contents of this specification shall prevail.

It is obvious to those skilled in the art that many improvements and changes are available to the specific embodiments of the present disclosure without departing from the scope or spirit of the present disclosure. Other embodiments will be apparent to the skilled person from the description of the disclosure. The description and embodiments of the present disclosure are exemplary only.

The terms "including", "comprising", "having" and "containing" used in this specification are all open terms, which means including but not limited to.

Figure 1:
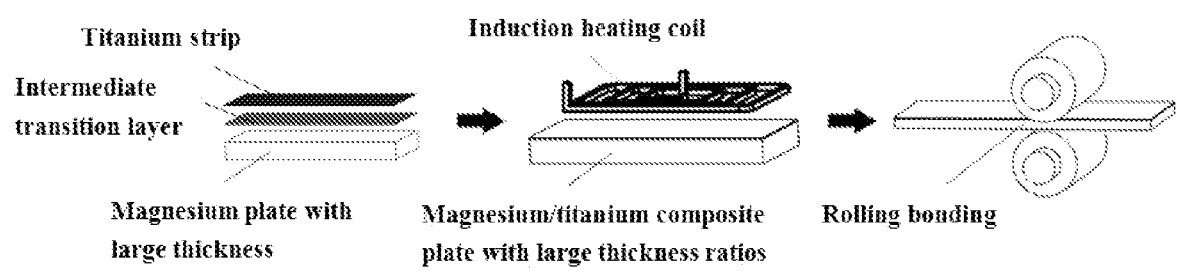
FIG. 1 is a diagram illustrating a composite process of gradient heterothermal rolling of magnesium/titanium composite plate with large thickness ratios of the present disclosure.

The schematic diagram of composite process of gradient heterothermal rolling of magnesium/titanium composite plate with large thickness ratios of the present disclosure is shown in FIG. 1.

Figure 2:
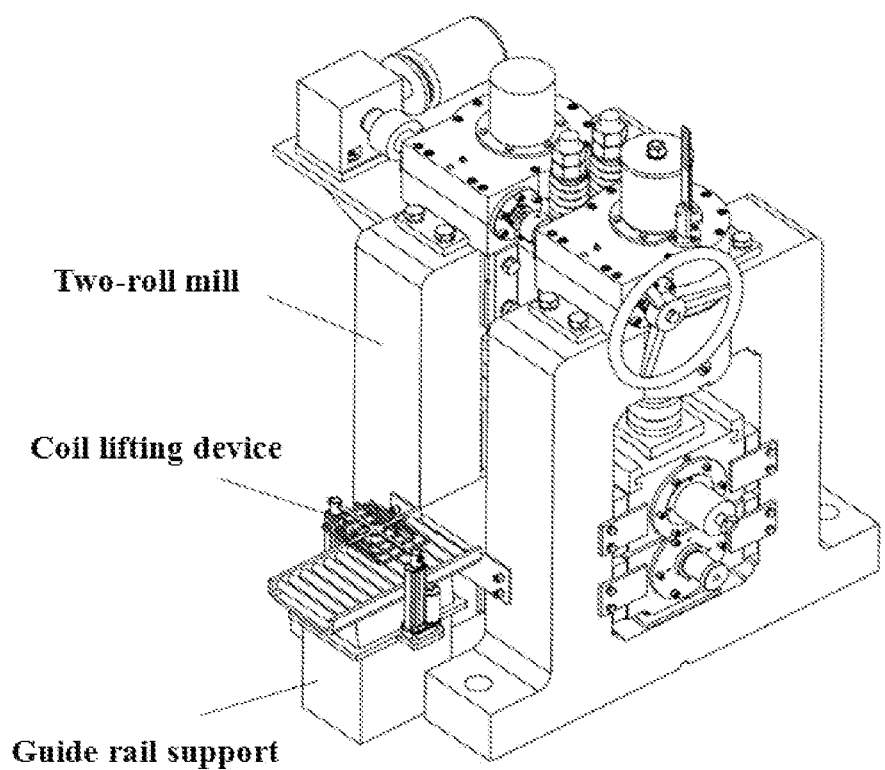
FIG. 2 shows a gradient heterothermal rolling bonding device for preparing the magnesium/titanium composite plate with large thickness ratios according to the present disclosure.
Figure 3:
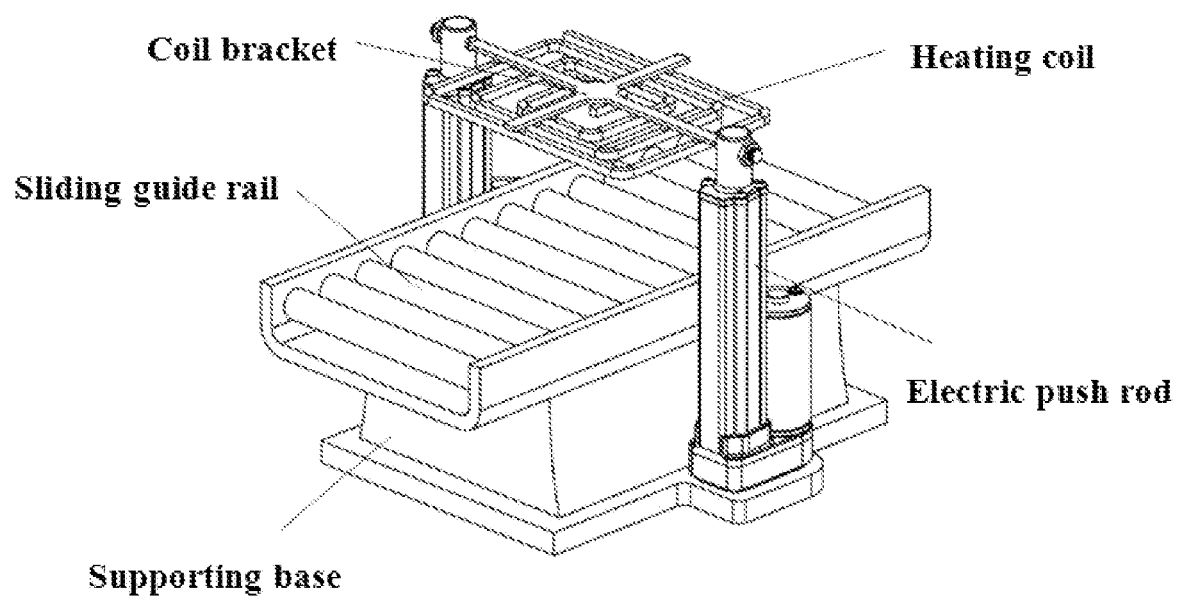
FIG. 3 shows a liftable electromagnetic induction heating device of the gradient heterothermal rolling bonding device according to the present disclosure.

In the embodiments of the present disclosure, the magnesium/titanium composite plate with large thickness ratios is prepared by the gradient heterothermal rolling bonding device as shown in FIG. 2 and FIG. 3; a temperature control system in the device includes an induction heating coil, an infrared temperature sensor, a controller and an intermediate frequency induction heating power supply; the control system includes comparing a temperature set value with a measured value of an infrared thermometer, and takes a deviation value of the temperature set value and the measured value as an input of the controller, the controller calculates the deviation value of the two, then outputs a corresponding control voltage signal to the induction heating power supply, and the induction heating power supply outputs a power corresponding to a control signal to carry out heating; a platform of a lifting mechanism in the device is used to fix the electromagnetic induction heating coil, and the up and down positions of the plate blank induction heating device are shifted by an externally connected lifting device, so that the electromagnetic induction coil is parallel to the plate blank and the distance is controllable. Other rolling devices that are capable of realizing temperature control of gradient heating may also be used to realize the preparation of magnesium/titanium composite plate with large thickness ratios.

Figure 4A:
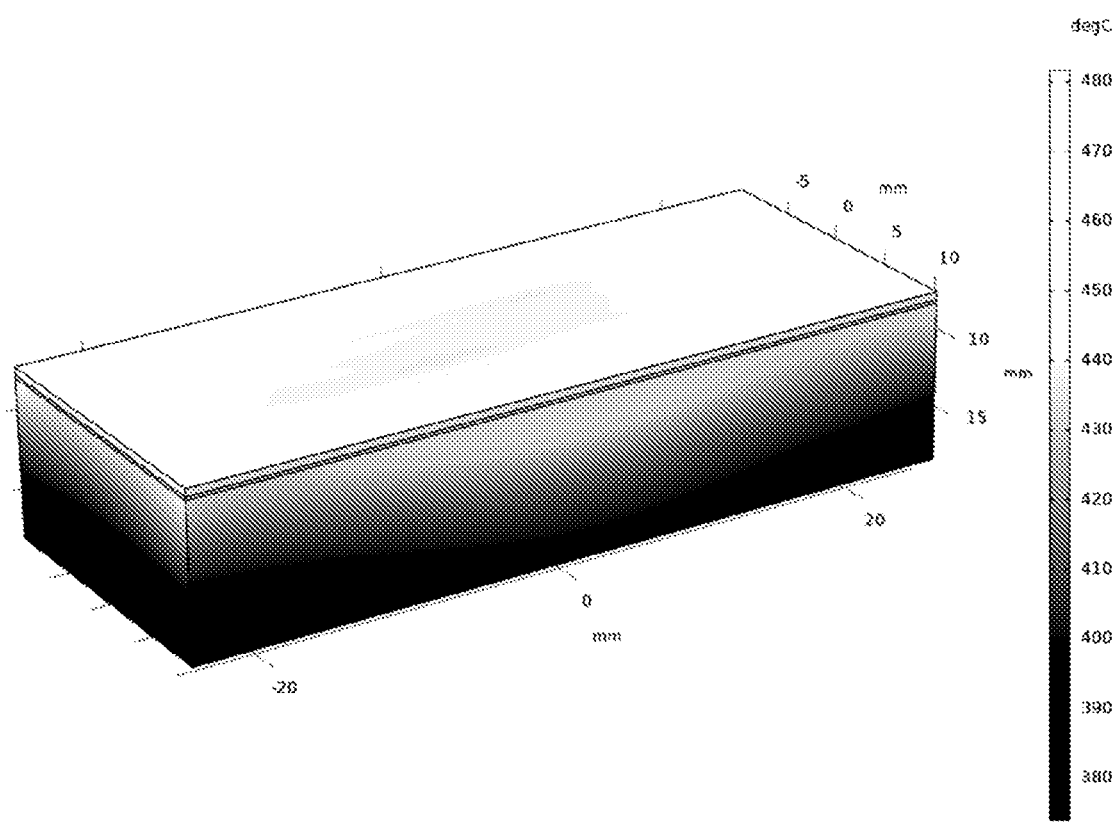
FIG. 4A shows an induction heating simulation according to the present disclosure. The temperature gradient distribution along the thickness direction of the composite slab, the temperature on the titanium side is approximately 480° C., and on the magnesium side is approximately 400° C.
Figure 4B:
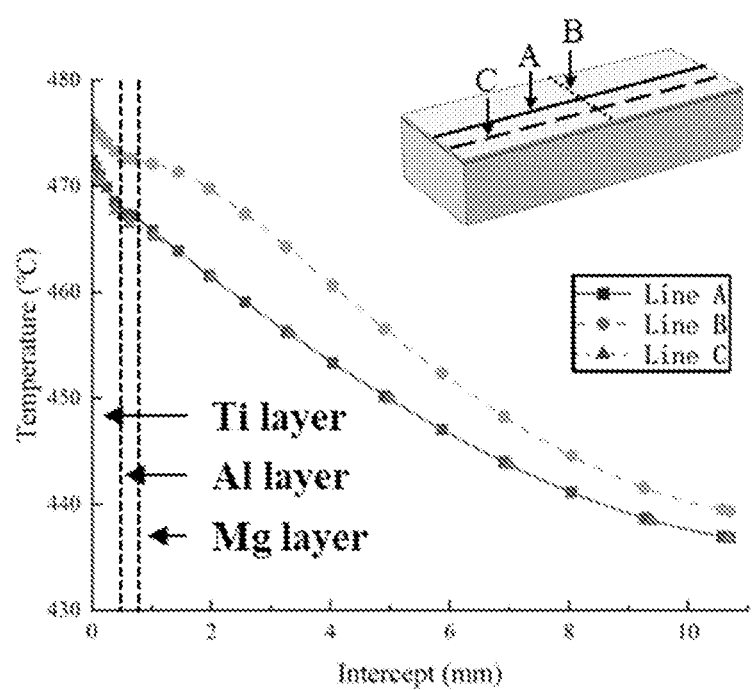
FIG. 4B illustrates a gradient temperature field analysis according to the present disclosure. Temperature distribution along the thickness at different positions of the composite slab was recorded at points A, B, and C. The temperature at the center of the composite slab is lower compared to other positions.
Figure 4C:
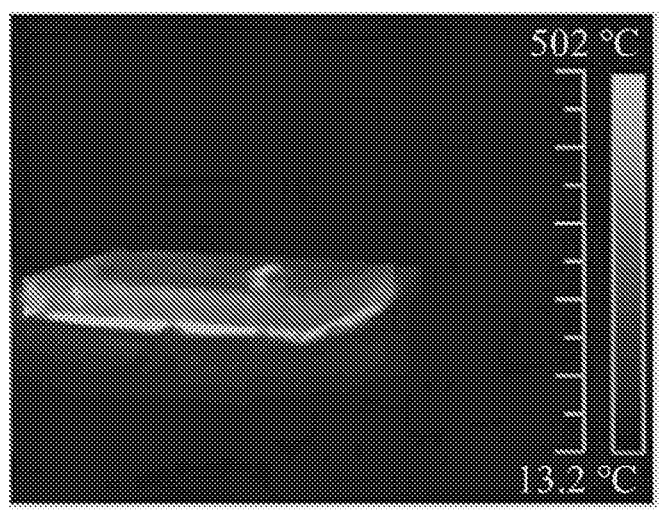
FIG. 4C shows an induction heating verification according to the present disclosure. The actual induction heating experiment and the simulated results show that the temperature distribution of the slab is basically consistent.

The finite element simulation and verification at the surface interface of the gradient temperature field of the disclosure is shown in FIG. 4A-FIG. 4C.

Embodiment 1

Figure 5:
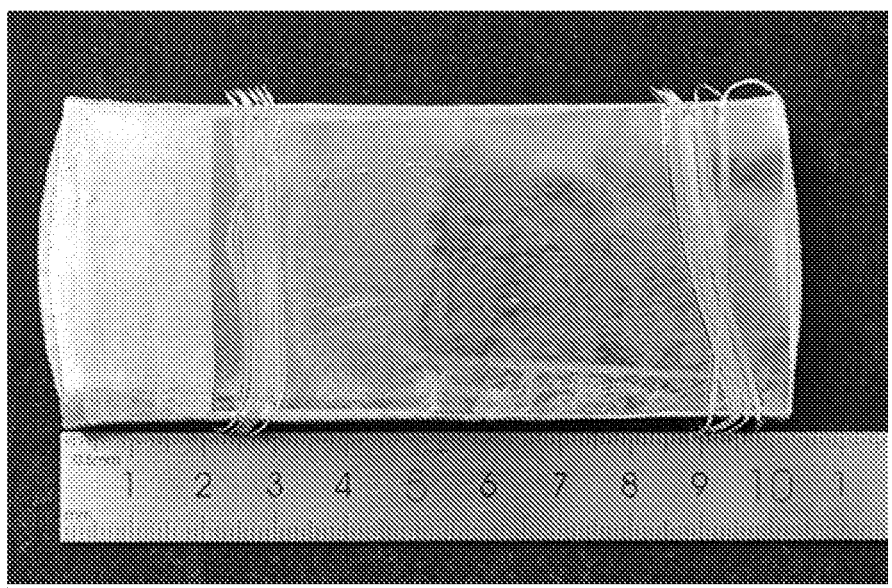
FIG. 5 is a macroscopic view of a magnesium/titanium composite plate with large thickness ratios prepared in Embodiment 1 of the present disclosure.
Figure 6:
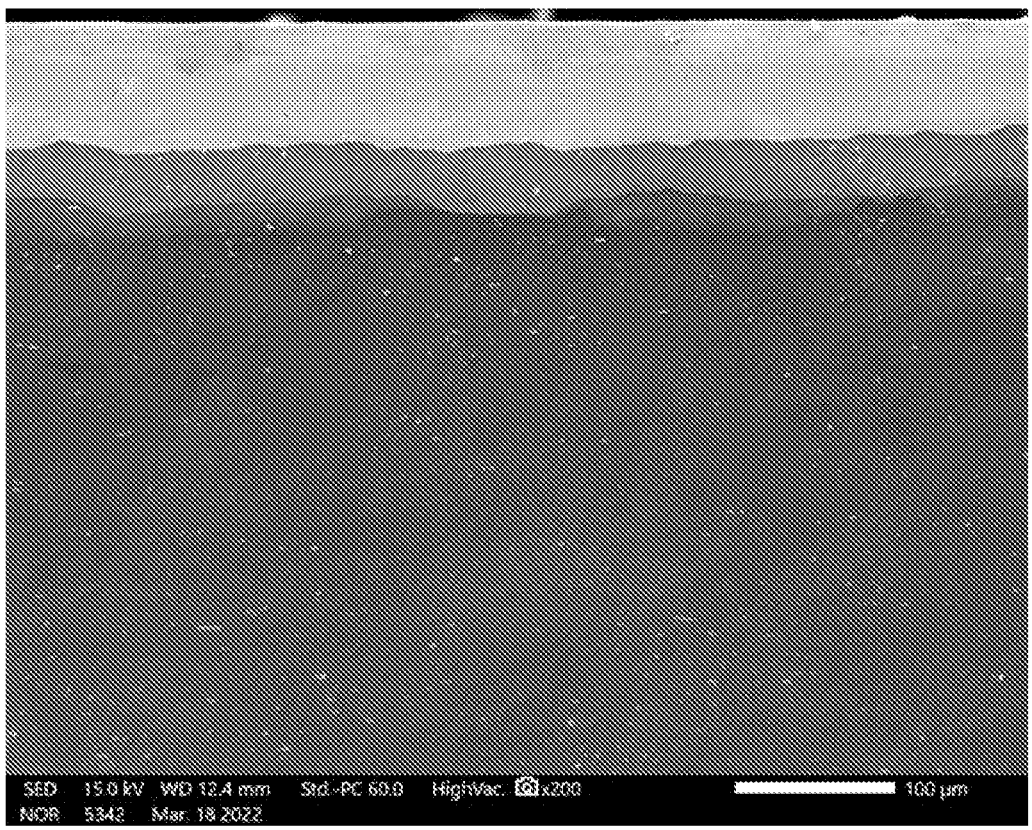
FIG. 6 is a metallographic diagram of a bonding interface of the magnesium/titanium composite plate with large thickness ratios prepared in Embodiment 1 of the present disclosure.

Step 1, pretreatment of plate blank: titanium strip TC4, aluminum foil AA1100 and magnesium alloy plate with large thickness AZ31 with thicknesses of 0.1 mm, 0.05 mm and 8 mm respectively are selected and prepared into standard rectangular blocks (with the same size of 80 millimeters (mm)×50 mm in length and width), followed by processing and chamfering; the titanium strip is placed in a box-type vacuum heat-treating furnace at 900 degrees Celsius (° C.) and held for 60 minutes (min), the magnesium alloy plate with large thickness is placed in a box-type vacuum heat-treating furnace at 300° C. and held for 30 min, the aluminum foil is placed in a box-type vacuum heat-treating furnace at 350° C. and held for 10 min, followed by furnace cooling and annealing treatment respectively, where the annealing atmosphere is argon, the pressure of the argon is 0.95 megapascal (MPa) (technical effects of 0.95-1 MPa and 0.95 MPa are fairly comparable), and the quality purity of argon is 99.99%;

the surfaces of magnesium alloy plate with large thickness, titanium strip and aluminium foil are processed, in which magnesium alloy plate as the base layer should be cleaned up at least one side to be combined, titanium plate as the compound layer should also be cleaned up at least one side to be combined with the plate surface, and aluminium foil as the transition layer should be cleaned up the oxide layers of the plate surfaces on both sides, and the contact surfaces to be combined should be appropriately polished along the direction of rolling using rotating steel wire method so as to make the combined surfaces having a certain roughness, and the surface roughness is Average roughness (Ra)1.6 (the technical effect of Ra1.6 may be achieved in a range of Ra0.8-Ra1.6), so as to ensure that the combined area is large enough; after polishing, the contact surfaces to be combined are placed into the acetone solution for ultrasonic cleaning for 10 min (or cleaning with anhydrous ethanol), and then dried with a blower;

the cleaned titanium strip, aluminium foil and magnesium alloy plate of large thickness are stacked in order, the surfaces of the surface-treated magnesium alloy plate and the titanium plate are laminated on both sides of the aluminium foil as the surfaces to be combined, and then leveled after the combination is completed to make a composite blank;

Step 2, local induction heating:

a. the customized induction heating coil is placed on the titanium strip side of the composite blank to ensure that the induction coil is parallel to the blank, the distance between the coil and the composite blank is adjusted to 5 mm by controlling the lifting device, the frequency of the intermediate-frequency induction power supply is set to 1000 hertz (Hz) and the current density is set to 50 $e^5$ amperes per square meter ($A/m^2$), and the required heating temperature of 450° C. is inputted into the controller of the induction heating system;

b. after the setup is completed, the intermediate-frequency induction power supply is activated, and the induction coil is charged with alternating current to heat the composite blank for 45 s, so that the composite blank is heated up and warmed up, and after the heating is completed, the composite blank is pushed into the rolling mill with the push plate to be rolled;

Step 3: rolling and compounding: the magnesium/titanium composite plate with large thickness ratios is rolled at a different temperature, the rolling direction and grinding direction should be consistent, the rolling speed is 1.0 meter per second (m/s), the amount of rolling reduction is 20%, the rolled composite blank is placed in a box-type vacuum heat-treating furnace at 500° C. and held for 60 min, followed by furnace cooling, and the protective atmosphere is argon atmosphere with argon gas pressure of 1 MPa, and argon gas quality purity of 99.99%;

Step 4: post-treatment of plate blank: the composite blank after cooling is refined, leveled and cut, and then the surface treatment of the composite plate is carried out by mechanical methods, and the surface is polished to the roughness of Ra1.6, then it is placed in acetone solution and ultrasonically cleaned for 10 min, followed by taken out and drying to obtain the magnesium/titanium composite plate with large thickness ratios without cracks on the surface, as shown in FIG. 5. The magnesium/titanium composite plate with large thickness ratios is observed in terms of by binding interface as shown in FIG. 6, where the three layers of materials from top to bottom are magnesium alloy, aluminium strip and titanium strip, and it is found that the interface of the composite plate is well combined without defects such as cracks and porosity, and certain plastic deformation occurs in the aluminium strip, with a relatively small thinning of the thickness of the titanium alloy strip.

Embodiment 2

Step 1, pretreatment of plate blank: titanium strip TC6, aluminum foil AA6061 and magnesium alloy plate with large thickness AZ31 with thicknesses of 0.2 mm, 0.05 mm and 10 mm respectively are selected and prepared into standard rectangular blocks (with the same size of 70 mm×40 mm in length and width), followed by processing and chamfering; the titanium strip is placed in a box-type vacuum heat-treating furnace at 950° C. and held for 90 min, the magnesium alloy plate with large thickness is placed in a box-type vacuum heat-treating furnace at 350° C. and held for 40 min, the aluminum foil is placed in a box-type vacuum heat-treating furnace at 400° C. and held for 5 min, followed by furnace cooling and annealing treatment respectively, where the annealing atmosphere is argon, the pressure of the argon is 0.95 MPa (technical effects of 0.95-1 MPa and 0.95 MPa are fairly comparable), and the quality purity of argon is 99.99%;

the surfaces of magnesium alloy plate with large thickness, titanium strip and aluminium foil are processed, in which magnesium alloy plate as the base layer should be cleaned up at least one side to be combined, titanium plate as the compound layer should also be cleaned up at least one side to be combined with the plate surface, and aluminium foil as the transition layer should be cleaned up the oxide layers of the plate surfaces on both sides, and the contact surfaces to be combined should be appropriately polished along the direction of rolling using rotating steel wire method so as to make the combined surfaces having a certain roughness, and the surface roughness is Ra1.6 (the technical effect of Ra1.6 can be achieved in a range of Ra0.8-Ra1.6), so as to ensure that the combined area is large enough, after polishing, the contact surfaces to be combined are placed into the acetone solution for ultrasonic cleaning for 10 min (or cleaning with anhydrous ethanol), and then dried with a blower;

the cleaned titanium strip, aluminium foil and magnesium alloy plate of large thickness are stacked in order, the surfaces of the surface-treated magnesium alloy plate and the titanium plate are laminated on both sides of the aluminium foil as the surfaces to be combined, and then leveled after the combination is completed to make a composite blank;

Step 2, local induction heating:
a. the customized induction heating coil is placed on the titanium strip side of the composite blank to ensure that the induction coil is parallel to the blank, the distance between the coil and the composite blank is adjusted to 4 mm by controlling the lifting device, the frequency of the intermediate-frequency induction power supply is set to 1500 Hz and the current density is set to 40 $e^5$ A/m², and the required heating temperature of 400° C. is inputted into the controller of the induction heating system;
b. after the setup is completed, the intermediate-frequency induction power supply is activated, and the induction coil is charged with alternating current to heat the composite blank for 50 s, so that the composite blank is heated up and warmed up, and after the heating is completed, the composite blank is pushed into the rolling mill with the push plate to be rolled;

Step 3: rolling and compounding: the magnesium/titanium composite plate with large thickness ratios is rolled at a different temperature, the rolling direction and grinding direction should be consistent, the rolling speed is 1.0 m/s, the amount of rolling reduction is 15%, the rolled composite blank is placed in a box-type vacuum heat-treating furnace at 450° C. and held for 60 min, followed by furnace cooling, and the protective atmosphere is argon atmosphere with argon gas pressure of 1 MPa, and argon gas quality purity of 99.99%;

Step 4: post-treatment of plate blank: the composite blank after cooling is refined, leveled and cut, and then the surface treatment of the composite plate is carried out by mechanical methods, and the surface is polished to the roughness of Ra1.6, then it is placed in acetone solution and ultrasonically cleaned for 10 min, followed by taken out and drying to obtain the magnesium/titanium composite plate with large thickness ratios without cracks on the surface; the interface of the composite plate is well combined without defects such as cracks and porosity, and certain plastic deformation occurs in the aluminium strip, with a relatively small thinning of the thickness of the titanium alloy strip.

Embodiment 3

Step 1, pretreatment of plate blank: titanium strip TC10, aluminum foil AA1100 and magnesium alloy plate with large thickness AZ61 with thicknesses of 0.4 mm, 0.05 mm and 15 mm respectively are selected and prepared into standard rectangular blocks (with the same size of 80 mm×40 mm in length and width), followed by processing and chamfering; the titanium strip is placed in a box-type vacuum heat-treating furnace at 1000° C. and held for 90 min, the magnesium alloy plate with large thickness is placed in a box-type vacuum heat-treating furnace at 300° C. and held for 45 min, the aluminum foil is placed in a box-type vacuum heat-treating furnace at 300° C. and held for 15 min, followed by furnace cooling and annealing treatment respectively, where the annealing atmosphere is argon, the pressure of the argon is 0.95 MPa (technical effects of 0.95-1 MPa and 0.95 MPa are fairly comparable), and the quality purity of argon is 99.99%;

the surfaces of magnesium alloy plate with large thickness, titanium strip and aluminium foil are processed, in which magnesium alloy plate as the base layer should be cleaned up at least one side to be combined, titanium plate as the compound layer should also be cleaned up at least one side to be combined with the plate surface, and aluminium foil as the transition layer should be cleaned up the oxide layers of the plate surfaces on both sides, and the contact surfaces to be combined should be appropriately polished along the direction of rolling using rotating steel wire method so as to make the combined surfaces having a certain roughness, and the surface roughness is Ra1.6 (the technical effect of Ra1.6 can be achieved in a range of Ra0.8-Ra1.6), so as to ensure that the combined area is large enough, after polishing, the contact surfaces to be combined are placed into the acetone solution for ultrasonic cleaning for 10 min (or cleaning with anhydrous ethanol), and then dried with a blower;

the cleaned titanium strip, aluminium foil and magnesium alloy plate of large thickness are stacked in order, the surfaces of the surface-treated magnesium alloy plate and the titanium plate are laminated on both sides of the aluminium foil as the surfaces to be combined, and then leveled after the combination is completed to make a composite blank;

Step 2, local induction heating:

a. the customized induction heating coil is placed on the titanium strip side of the composite blank to ensure that the induction coil is parallel to the blank, the distance between the coil and the composite blank is adjusted to 5 mm by controlling the lifting device, the frequency of the intermediate-frequency induction power supply is set to 3000 Hz and the current density is set to 40 $e^5$ $A/m^2$, and the required heating temperature of 500° C. is inputted into the controller of the induction heating system;

b. after the setup is completed, the intermediate-frequency induction power supply is activated, and the induction coil is charged with alternating current to heat the composite blank for 45 s, so that the composite blank is heated up and warmed up, and after the heating is completed, the composite blank is pushed into the rolling mill with the push plate to be rolled;

Step 3: rolling and compounding: the magnesium/titanium composite plate with large thickness ratios is rolled at a different temperature, the rolling direction and grinding direction should be consistent, the rolling speed is 0.5 m/s, the amount of rolling reduction is 15%, the rolled composite blank is placed in a box-type vacuum heat-treating furnace at 500° C. and held for 90 min, followed by furnace cooling, and the protective atmosphere is argon atmosphere with argon gas pressure of 1 MPa, and argon gas quality purity of 99.99%;

Step 4: post-treatment of plate blank: the composite blank after cooling is refined, leveled and cut, and then the surface treatment of the composite plate is carried out by mechanical methods, and the surface is polished to the roughness of Ra1.6, then it is placed in acetone solution and ultrasonically cleaned for 10 min, followed by taken out and drying to obtain the magnesium/titanium composite plate with large thickness ratios without cracks on the surface; the interface of the composite plate is well combined without defects such as cracks and porosity, and certain plastic deformation occurs in the aluminium strip, with a relatively small thinning of the thickness of the titanium alloy strip.

The gradient heterothermal rolling bonding method provided by the present disclosure promotes the high-quality combination of heterogeneous materials under small rolling reduction, thus lowering the critical composite deformation rate and greatly reducing the performance requirements for the rolling mill. The surface quality of the composite plate obtained is good, with no cracking at the edges and ends, flat plate shape, good bonding interface, uniform and fine plate organization, and excellent mechanical properties.

The above-mentioned embodiments only describe the preferred mode of the present disclosure, and do not limit the scope of the present disclosure. Under the premise of not departing from the design spirit of the present disclosure, various modifications and improvements made by ordinary technicians in the field to the technical scheme of the present disclosure shall fall within the protection scope determined by the claims of the present disclosure.

What is claimed is:

1. A preparation method of a magnesium/titanium composite plate, comprising following steps:
    assembling blanks according to a sequence of a titanium strip, a transition layer foil and a magnesium alloy plate to obtain a composite blank;
    carrying out an induction heating treatment on one side of the titanium strip of the composite blank, and then rolling, and carrying out a heat treatment on a composite plate blank after rolling to obtain the magnesium/titanium composite plate;
    a thickness ratio of the magnesium alloy plate to the titanium strip is greater than or equal to 20:1;
    the titanium strip, the transition layer foil and the magnesium alloy plate are respectively subjected to an annealing treatment before the assembling, specifically, the titanium strip is held at 900-1000° C. for 60-90 min, the transition layer foil is held at 300-400° C. for 5-15 min, and the magnesium alloy plate is held at 300-400° C. for 30-60 min;
    after the annealing treatment, the titanium strip, transition layer foil and magnesium alloy plate are further subjected to a step of surface treatment to remove oxide layers;
    the transition layer foil is aluminum foil, zinc foil or aluminum-zinc alloy foil;
    the induction heating treatment specifically comprises:
    placing an induction heating coil on one side of the titanium strip of the composite blank to make the induction heating coil parallel to the composite blank, adjusting a distance between the induction heating coil and the composite blank to be 3-10 mm, and setting a heating temperature of heating the composite blank to be 400-600° C. for 15-150 s;
    a rolling reduction is 15-20% and a rolling speed is 0.5-1.0 m/s;
    a heterothermal rolling device for the preparation method of the magnesium/titanium composite plate comprises a guide rail support, two sides of the guide rail support are fixedly connected with a two-roll mill, a coil lifting device is fixedly connected to a feeding side of the two-roll mill and a top surface of one end of the guide rail support, the guide rail support is located between bottom ends of the two-roll mill, and the feeding side of the two-roll mill is correspondingly arranged with a discharging end of the coil lifting device.

2. The preparation method according to claim 1, wherein the heat treatment specifically comprises holding at 400-500° C. for 60-90 min.

3. The preparation method according to claim 1, wherein a thickness of the magnesium alloy plate is 8-20 mm, a thickness of the titanium strip is 0.1-0.3 mm, and a thickness of the transition layer foil is 0.02-0.1 mm.

* * * * *